United States Patent [19]

Alfrey

[11] Patent Number: 4,652,295
[45] Date of Patent: Mar. 24, 1987

[54] FERTILIZER MANUFACTURE

[76] Inventor: Norval K. Alfrey, Rte. 9, Box 143B, Lake City, Fla. 32055

[21] Appl. No.: 311,462

[22] Filed: Oct. 14, 1981

Related U.S. Application Data

[63] Continuation-in-part of Ser. No. 209,489, Nov. 24, 1980, which is a continuation-in-part of Ser. No. 78,085, Sep. 24, 1979.

[51] Int. Cl.⁴ .............................................. C05B 11/00
[52] U.S. Cl. .......................................... 71/43; 71/34; 423/310; 423/312
[58] Field of Search ...................... 71/43, 34; 423/310, 423/312, 313

[56] References Cited

U.S. PATENT DOCUMENTS

| | | | |
|---|---|---|---|
| 3,533,829 | 10/1970 | Quanquin | 71/34 |
| 3,730,700 | 5/1973 | Groenueld | 71/34 |
| 3,988,140 | 10/1976 | Burns et al. | 71/34 |
| 4,341,739 | 7/1982 | Ellis et al. | 422/207 |

FOREIGN PATENT DOCUMENTS 515740  8/1955  Canada ................................... 71/43

Primary Examiner—William R. Dixon, Jr.
Assistant Examiner—A. Knab
Attorney, Agent, or Firm—William David Kiesel; Robert C. Tucker

[57] ABSTRACT

An improved continuous process for the production of fertilizers, wherein the reactions, mixing, sizing, and moisture removal required to produce a resultant product are carried out on a simple, flat surface that moves horizontally, and wherein, in the reactor-mixing zone of said surface, the surface movement, the shearing action of moving blades, the moving spargers for distributing reactants and reaction products, the unusually wide dispersion of the reactants and reaction products, and the unusually long retention time and extensive aeration of the final reaction products and reacted product have the useful benefits of low consumption of energy, close product size control, elimination of the need for recycling produced materials as a means of wetness control in the reactor-mixing zone, and of achieving relatively simple, low cost processing.

11 Claims, 8 Drawing Figures

FERTILIZER MANUFACTURE

RELATED APPLICATION

This application is a continuation-in-part application of U.S. patent application Ser. No. 209,489, filed Nov. 24, 1980 by the inventor herein and entitled "Fertilizer Manufacture" which application in turn is a continuation-in-part of U.S. patent application Ser. No. 078,085, filed Sept. 24, 1979 by the inventor herein and entitled, "Fertilizer Manufacture," mention of which is made herein for the purposes of obtaining benefit of its earlier filing date.

BACKGROUND OF THE INVENTION

1. Field of the Invention

This invention relates broadly to the manufacture of fertilizers.

2. Prior Art

Fertilizers usually contain one, but more often, two or all three of the main elements which are needed for growing crops, i.e., nitrogen, phosphorous and potassium. A mixture containing all three elements in the desired proportions is said to be a complete fertilizer and it is common practice to speak of such compositions in terms of percentages of N, $P_2O_5$, and $K_2O$ in forms available to growing crops and expressed in that order. For example, a formula such as 5-10-5 refers to a mixture containing five (5%) percent N, ten (10%) percent $P_2O_5$ and five (5%) percent $K_2O$.

Research into various methods of manufacture of fertilizers has been extensive and has resulted in development of a multitude of processes. In almost each process, phosphoric acid and ammonia are mixed to yield various reactant products and, in particular, monoammonium phosphate or diammonium phosphate or both according to the following equations:

$$NH_3 + H_3PO_4 \rightarrow NH_4H_2PO_4$$

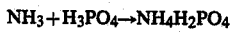

$$NH_4H_2PO_4 + NH_3 \rightarrow (NH_4)_2HPO_4$$

Summaries of various processes can be found in the publications by the United Nations Industrial Development Organization entitled "Development and Transfer of Technology Series No. 8—Process Technologies for Phosphate Fertilizers" (1978 Edition) and "Development and Transfer of Technology Series No. 9—Process Technologies for Nitrogen Fertilizers" (1978 Edition).

In some of the more recent processes described, the neutralization reactions described above are carried out in a variety of types of reactors, such as pipe tee reactors and pipe cross reactors. These utilize the heat released by the reaction to produce varying amounts of ammonia polyphosphates, dependent upon the maximum temperature attained in the pipe reactor and the length of time the reacting materials are retained therein.

In these reactions, water solubility of the ammonia polyphosphate compositions decreases as the extent of formation of the polyphosphate increases. Since a high water solubility is a highly desirable feature of the fertilizer product, the temperature and retention of the products in the pipe reactor are usually controlled so that only ten (10%) of the $P_2O_5$ is in the polyphosphate form. This leads to one of the major shortcomings of the processes utilizing pipe reactors, pipe tee reactors and pipe cross reactors. In this instance, the slurry melt that is discharged from the reactors is either caused to spew from the open discharge end of the reaction pipe or from relatively large orifices located along the discharge-most section of the reaction pipe. Often, the reacted melt is thrown and spewn from the reactor pipe in such a manner as to create a squirting stream and blob-like localized collections that in turn cause localized overwetting of and thus an increased requirement for recycling material, while simultaneously creating aerosol-like mists that float in the exiting gases, increasing duct-hard panning and increasing the scrubber workload.

In order to overcome some of these difficulties, in some instances the partially neutralized salts are pumped from preneutralizer tanks and sprayed through atomizing nozzles, which do somewhat control the particle sizes of the atomized slurries, but, unfortunately, such atomized slurries typically contain 12 to 20% water, which entails the costly processing steps comprised of a high recycled product material requirement of 6–10 tons of recycle per ton being produced, and a drying step which consumes a considerable amount of energy in the form of fuel to remove the moisture.

As a result of the high recycle requirement, either the production rate must be prohibitively low or the equipment must be of large capacity. As a result of the drying requirement, the energy needed in the form of fuel is high, typically 500,000 to one million btu per ton being produced. Although the pipe reactors have demononstrated that they can, if properly used under very carefully controlled conditions, eliminate the drying step and reduce the recycle requirement to between 2–3 tons of recycle per ton being produced, they do not solve the problem of requiring recycling to the seed bed which necessitates costly enlargement of the reactor-granulation means and of other equipment in the process, nor of the undesirable equipment complexity problem which exists with conventional processes.

In a typical conventional system, the following multiple pieces of equipment would become necessary: The granulator system comprised of the granulator, spargers, exhaust ducts, exhausting fan and a wet scrubbing unit; the granulator discharge chute; the rotary tube drier system complete with lifting flights, direct fire furnace, entrance and exit breaching, exhausting ducts, exhausting fan, gravity dust cyclones and wet scrubber system for the drier exit gases; the lump crusher located in the stream of materials exiting the drier; the gravity drier discharge chute; the chain driven bucket elevator which transports materials exiting the drier and feeds through gravity chutes into the classifying system comprised of scalping screens and classifying screens; the scalped and classified oversized fraction is fed through gravity chutes into multiple banks of crushers—typically chain mills or cage mills—and then is recycled via the recycle conveying system, typically comprised of a recycle conveyor, gravity feed and discharge chutes and a chain type bucket elevator which discharges the recycled material through a gravity chute into the granulator; the undersized fraction flows from the classifiers by gravity chutes into the recycle conveying system already referred to; a large portion of the product sized fraction is typically diverted from the classifier product stream via gravity chute into the recycle system—the amount of product recycle is that which is needed to control wetness of the granules in the granulator; the product fraction which is to be removed from the process to storage is cooled in a rotary drum type or fluid bed type cooler system comprised of the cooler, gravity type feed and exit chutes, exit gas breeching, exit gas ducts, gravity type dust cyclones, exit gas exhauster fan and a wet scrubber system to remove particulate dust from the exhaust gases before their being vented to atmosphere; the cool product fraction leaving the cooler is frequently fed through a gravity type chute to a chain driven bucket elevator, then discharged through a gravity chute into a vibrating polishing screen for a final removal of dust and undersized fines from the product which is then conveyed to storage.

Additionally, even with the more efficient of the conventional prior art processes, although said processes are currently accepted commercially, there exists costly and undesirable difficulties caused specifically by the methods inherently employed in said processes for contacting the reactants, carrying out the reactions, dispersing the reaction products, combining the reactants and the final reaction products into the bed of recycle particles—said particles being required to serve as nuclei, forming the said particles into granules having a desired size, and removing moisture from the said particles so as to dry the resultant product.

Additional specific examples of costly, undesirable difficulties with the more commercially prominent and currently preferred conventional prior-art processes are given in the following:

1. Processes described in Nielsson U.S. Pat. No. 2,729,554, Achorn U.S. Pat. Nos. 3,153,574, and 3,954,942, use stationary sparging means, also having a fixed, pre-determined location, so as to feed reactants and reaction products into a tumbling seed bed of nuclei particles that include recycled particles, in a near-horizontal rotary drum ammoniator-granulator, wherein the extent of attainment of uniform wetting of the particles, stoichiometric uniformity of the contacting reactants and uniformity of granule sizing are all keys to attaining a commercially acceptable performance of and to the actual successful carrying out of the said processes.

Yet, it is long recognized by those skilled in the art that unfortunately, although said processes perform reasonably well in pilot scale, and are considered to be acceptable and even often preferred over competitor prior-art processes for use in commercial operations, there exists costly and undesirable difficulties in the reaction-mixing zones of said processes, in both the attaining and the maintaining of the desired uniformity in the contacting, the stoichiometry, the mixing, the dispersing and reacting of the reactants, and in attaining and maintaining a desired size of the product granules.

Additionally, there exists, due to inherent limitations in said processes, costly and undesirable difficulties in the separation and removing of moisture vapor from said seed bed, said granules, and from said rotating drum means.

Specifically, frequent shut-downs of the processes in commercial operations are required, typically once each day briefly, and once each week for a more extended period of time in order to clean or replace said spargers and said spraying means, and to remove from said rotary drum means, exit gas breeching, ductwork, and at times scrubbers, such accumulations of such unwanted exit gas contaminants as recycle dusts and aerosols discharged from prereactor pipes and from the aforementioned spraying means.

Additionally, any lack of uniformity in the aforementioned seed bed, of the aforementioned contacting, stoichiometry, mixing, dispersing, reactions, and granule sizing has the costly and undesirable effects of increasing the frequency of operation shut-downs, increasing the amount of required recycle, and of decreasing granule size uniformity which, in turn, increases requirements for drying, screening, oversize crushing, and recycling the product. Costs are thereby increased.

The aforementioned sparging means and spraying means are stationary and hence do not move around throughout the aforementioned seed bed; therefore cannot take advantage of such movement to gain the useful effects of improving the aforementioned dispersing, contacting, mixing, reacting and granulating size control.

Unfortunately, as recognized by those skilled in the art and in its practice, the cited prior-art processes cannot achieve a thorough mixing action in the said reactor-mixing zones, especially because the fertilizer materials in the exit-most parts of said zones cannot be trans-moved back so as to mix with the fertilizer materials in the feed-most parts of said zones. Instead, the required rotary drum means for the said contacting, dispersing, mixing, reacting, and sizing granulation, imparts a tumbling, cascading movement to the said seed bed lateral to the longitudinal, ribbon-like flow of said seed bed through said drum, without providing means for the frequently badly needed back-folding mixing movements which are widely known by those skilled in the practicing of the art to be virtually essential to assuring a thorough mixing of a particulate materials. Additionally, with said rotary drum means, movement throughout said seed bed of the sparger means, of the various types of pipe reactor discharging means, or of any of the various spraying means is not feasible, especially due to such inherently limiting features of the said processes as a rotary drum means having an enclosing cylindrical housing and having relatively rigid limitations on the maximum feasible diameter of said cylinder, generally accepted by those skilled in the practice of the art as being about 15 feet diameter, maximum.

Streams of fluids leaving said stationary sparging and spraying means, even when emitted through elongated slots and multiple nozzles and orifices, cannot in themselves gain the needed uniformity in the seed bed previously described. Instead, the cascading and tumbling of said seed bed must accomplish much of the desired said uniformity. Unfortunately, a rotating drum means, while acceptable in many aspects, imposes several serious inherent handicaps against attaining the desired aforementioned uniformity. In explanation: The said rotary drum means provides primarily a simple circular tumbling action to said seed bed, which said tumbling action is limited so as to avoid excessively strong centrifugal and centripetal forces, and said drum also causes a relatively slow longitudinal, ribbon-like movement of said bed toward the exit end of said drum with virtually no trans-movements of said materials in the said bed toward the exit to the feedmost zones as was described in the aforementioned concerning mixing. Consequently, once uniformity imperfections occur, they must largely carry through the said drum and exit therefrom without correction because inherent to said processes there is no feasible means to make such corrections. This is true, even when severe imperfections occur, such as a severe lack of wetness or a severe overwetness. The costly and undesirable consequence is that very careful surveillance attention, so as to attempt to anticipate and to take corrective actions ahead of the event—when possible—so as to prevent it, or alternately, so as to readjust process controls as needed to cope with the said undesirable event, must be provided by trained experts in the practice of the art, on a continuous, on-going basis. Without said surveillance, and to an undesirable degree even when said surveillance is provided, said imperfections that have no means for their correction occur with sufficient frequency and with sufficient severity as to typically cause costly hardships, especially in typical commercial operations of the said processes. Said imperfections constitute one of the major costly and undesirable features of said processes, due to frequently occurring resultant increased requirements for recycling to avoid overwetness and resultant over-agglomeration of materials in said seed bed, excessive loss of ammonia from said seed bed, and excessive spread of the particle sizes of the granules leaving said seed bed. All of these difficulties cause costly decreases in the production rates and costly increases in the consumption of energy for fuel and electric power.

2. The process described in Quanquin U.S. Pat. No. 3,533,829, wherein a fluid bed means is used to obtain the necessary contacting, dispersing, mixing, reacting and granulation sizing in the reactor-mixing bed, also has, as was described for the aforementioned processes, the unfortunate, handicapping lack of capability for back-mixing from the exit-most zones to the feed-most zones of the said bed. Additionally, it is well known and long recognized by those skilled in the art, that costly requirement for electric power to facilitate fluidizing said bed is excessive and handicapping, compared with other, more preferred conventional prior-art means such as a rotary drum. This would become especially true if the aforementioned handicapping features of competitor prior-art processes were significantly improved upon, such as I have accomplished with my invention described herein.

A further handicapping feature of the said fluid bed process is the requirement for using stationary sparging means and stationary multiple spray nozzle means for feeding the reactants and reaction products into the reactor-mixing zone, for reasons already described in the aforementioned. Unfortunately, it is inherently not feasible to provide movement throughout said reactor-mixing zone for said sparging and spraying means in fluid bed processes, hence the necessary contacting, dispersing, and mixing in said zone is handicapped.

3. The process described in Groenweld U.S. Pat. No. 3,730,700, carries out reactions in an elongated reaction zone under the high velocity conditions of a venturi-type reactor, but unfortunately, said reaction zone means is rigid, causing it to lack the important ability which I have invented, to be adjusted and altered in cross-sectional area to a larger area or a smaller area while in operation, without interrupting or interferring with said operation, for the important purpose of increasing or decreasing the size of the reacted product being emitted from said reaction zone, hence, while in operation said process has no means for increasing or decreasing the size of the reacted product droplets except by altering conditions other than said reaction means in said zone, such as altering the input flow rates of the reactants which so doing would have the undesirable effect of altering the production rate and the rate of droplet input to the downstream portions which in turn would tend to upset operating controls for those portions.

Additionally, the aforementioned unadjustability of the cross sectional area further handicaps the said process by leaving it to other, less desirable means to help prevent, reduce or remove as required, the deposition of solid products on the inside surfaces of said processing means. Said less desirable means, such as rigidly controlling the velocities of the input reactants, limits the flexibility of the processing procedures, hence rendering it more difficult to cope with said depositions.

4. The process described in Burns U.S. Pat. No. 3,988,140, unfortunately requires careful pre-selection of the phosphoric acid feedstocks based on limiting the allowable concentrations of especially $Fe_2O_3$, $Al_2O_3$, and MgO to levels that are acceptable for the successful operation of said process. My invention entails no such limitations.

5. The process described in Canadian Pat. No. 515,740 requires a near horizontal rotating cylinder or tube reactor means which unfortunately entails all of the mixing handicaps and costly difficulties, plus all of the moisture vapor removal difficulties as well as the various costly difficulties and limitations caused by stationary sparging means and stationary spraying means described in the aforementioned for the aforementioned rotary drum reactor-granulator means. Additionally, said process requires the addition of superphosphate or other solid material into the mixing zone so as to help control the wetness of such fluid reactants as mineral acids, ammonia, water and the reaction products therefrom. It is well known and long recognized by those skilled in the art, that the said process is not practical nor competitive for use in producing such products as ammonia phosphates wherein the reactants are solely wet process phosphoric acid, sulfuric acid and ammonia in various stoichiometric combinations, especially because, among other less insurmountable inherent obstacles, the recycle requirement would be prohibitively high—in the range of 15 parts to 1 part of production, the drying requirement would be prohibitively costly—in excess of 1.5 million btu per ton produced, and the reaction efficiency in the reactor would be extremely poor and unacceptable, compared with said reaction efficiencies with commerically accepted and popular prior-art processes.

SUMMARY OF THE INVENTION

Therefore, it is an object of this invention to provide an improved continuous process for economically and efficiently producing a fertilizer.

Another object of this invention is to provide a continuous improved process for producing fertilizer which eliminates recycle requirements for ammonia salts.

A still further object of this invention is to provide a process which requires less energy for manufacturing fertilizers.

A still further object of this invention is to provide a process for producing fertilizers having means for controlling the particle size of the atomized reaction products as they leave the reactor so as to give a substantially dry granular fertilizer directly as a reaction product.

A further object of this invention is to provide a process for manufacturing fertilizers which utilizes fewer pieces of equipment required in the process, which reduces the capital cost of the process, reduces manpower and supervisory requirements to operate the process, reduces electrical energy required to run the equipment, reduces the maintenance requirement for the process and reduces the gases which must be exhausted from the process and submitted to air pollution abatement scrubbing actions.

Another object of this invention is to provide a continuous process for drilling and granulating fertilizers, such as urea ammonium nitrate, nitric phosphates, ammonia phosphates and nitrogen-phosphorus-potassium grades.

A further object of this invention is to provide an improved continuous process for producing fertilizers having significantly and importantly improved contacting, dispersing, reacting, mixing, and granule size controlling in the reactor-mixing zones, compared with that which occurs with conventional prior-art processes.

A further object of this invention is to provide an improved continuous process for producing fertilizers, having in the reactor-mixing zone significant and important increases in the extent of dispersion of the reactants and reaction products by positive means, in the extent of aeration of the granules by position means, and increases in the feasible retention time in said zone, so as to gain significant and important increases in the uniformity of dispersion of the reactants and reaction products in said zone, and in the time utilized for aeration and for agglomeration of the particles in said zone into granules of a preferred size; said increases having the important and valuable benefits of helping the reactants to react more completely in a more dispersed configuration, of sizing the granules more closely, and of sweeping away moisture vapor from said zone more extensively, with the resultant useful and important benefits of helping to eliminate the need for recycle, to reduce the loss of ammonia to the scrubbers, to dry the product granules, and to simplify and reduce the cost of the process and the cost of operating said process, compared with conventional prior-art processes.

Other objects and advantages of this invention shall become apparent from the ensuing description of the invention.

Accordingly, the reaction products are contacted in a variable cross section orifice zone of a controlled dispersion reactor for a predetermined period of time, then the resultant product is discharged in the form of drops having a controlled size from said orifice zone at a controlled velocity onto a flat, horizontal moving surface in a reactor mixing zone where, by positive moving means said sized resultant product is dispersed, combined and reacted with reactants which are also dispensed and dispersed onto said surface in said zone by positive moving means extensively mixed and aerated for a period of time necesssary to be agglomerated into closely sized granules that are substantially dry, to produce the desired fertilizer product, at which time the product is removed from the said moving surface.

BRIEF DESCRIPTION OF THE DRAWINGS

FIG. 6 is an alternate preferred embodiment of the controlled dispersion reactor.

FIG. 7 is a cross sectional view taken along lines 7—7 of FIG. 6.

FIG. 8 is a schematic drawing of a preferred embodiment of this invention depicting a mixer-sparger assembly.

PREFERRED EMBODIMENTS OF THE INVENTION

Without any intent to limit the scope of this invention, the preferred embodiments of this invention shall be discussed utilizing a process for producing a phosphate fertilizer.

Also, for purposes of this invention, a "controlled dispersion reactor" shall mean an apparatus having a convergent inlet section which swages to an orifice section the cross sectional area of which can be varied during operation connecting to a divergent exiting or discharge section.

Figure 1:
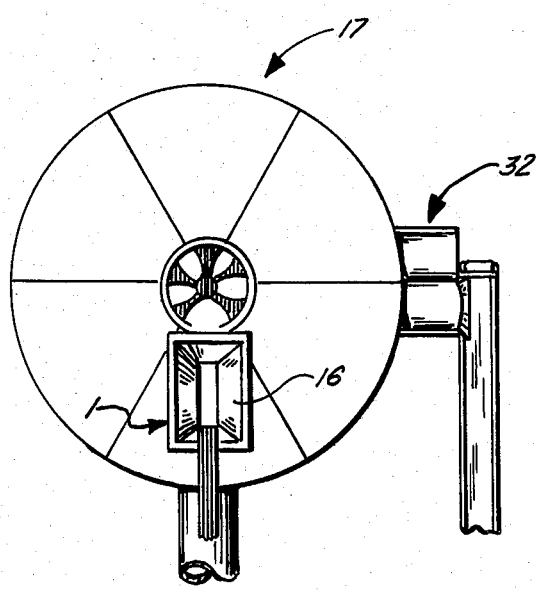
FIG. 1 is a three dimensional, top view of a preferred embodiment of this invention.
Figure 2:
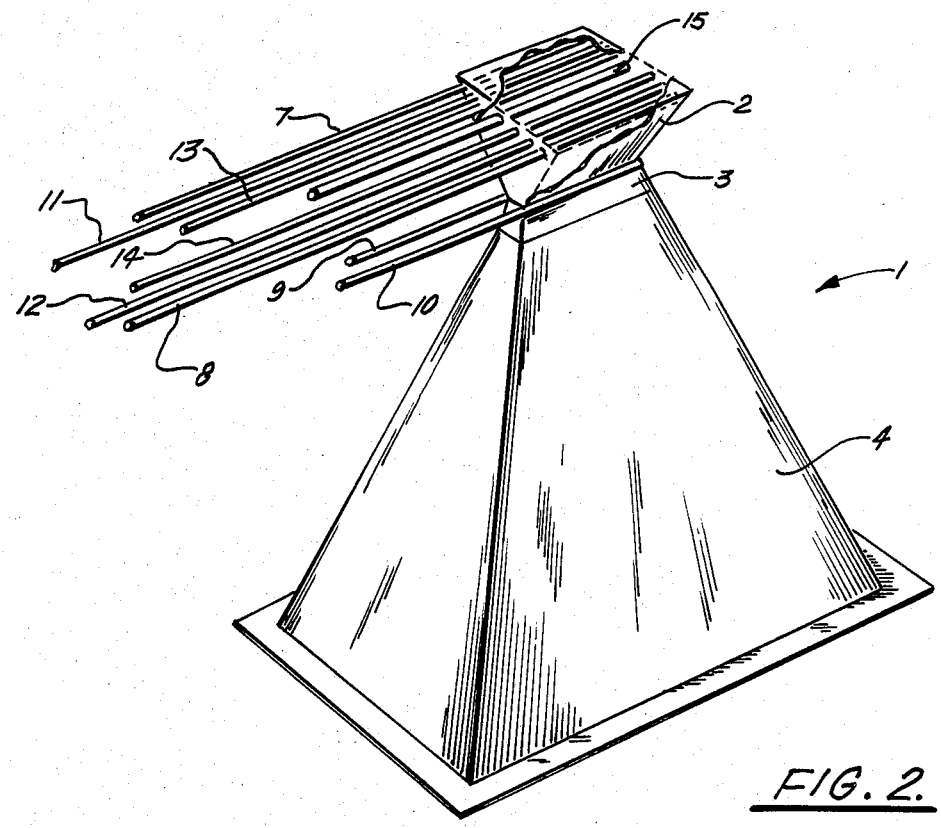
FIG. 2 is a three dimensional elevated view illustrating a preferred embodiment of the controlled dispersion reactor.
Figure 3:
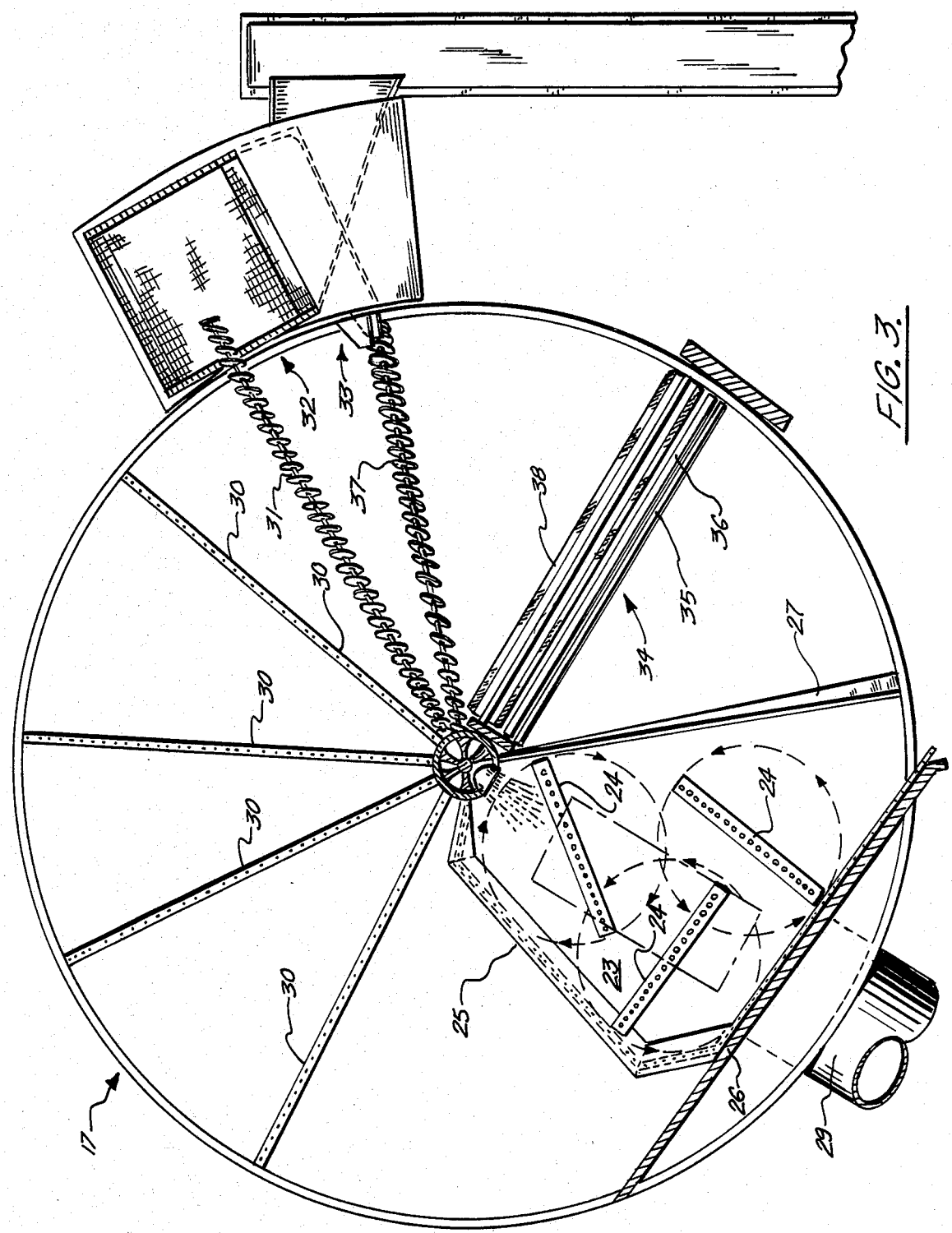
FIG. 3 is a three dimensional, cutaway top view of a preferred embodiment of this invention.
Figure 4:
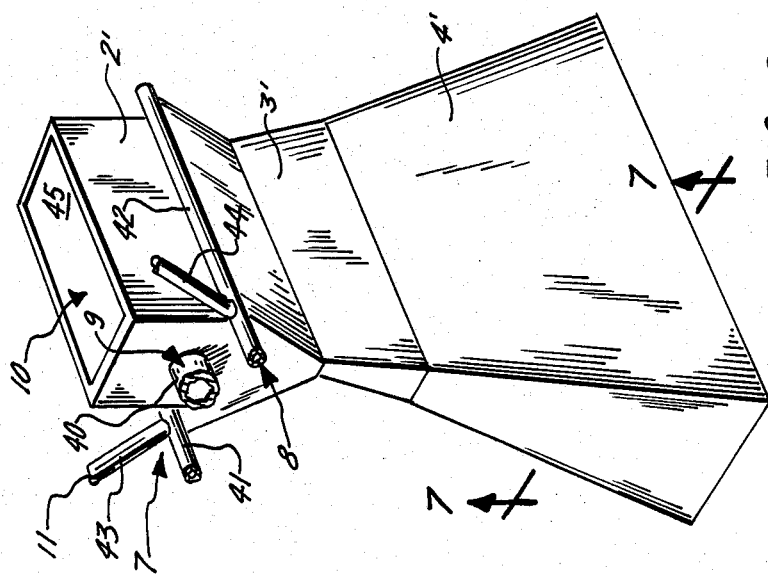
FIG. 4 is a three dimensional elevated view illustrating a preferred embodiment of the mixing zone.
Figure 5:
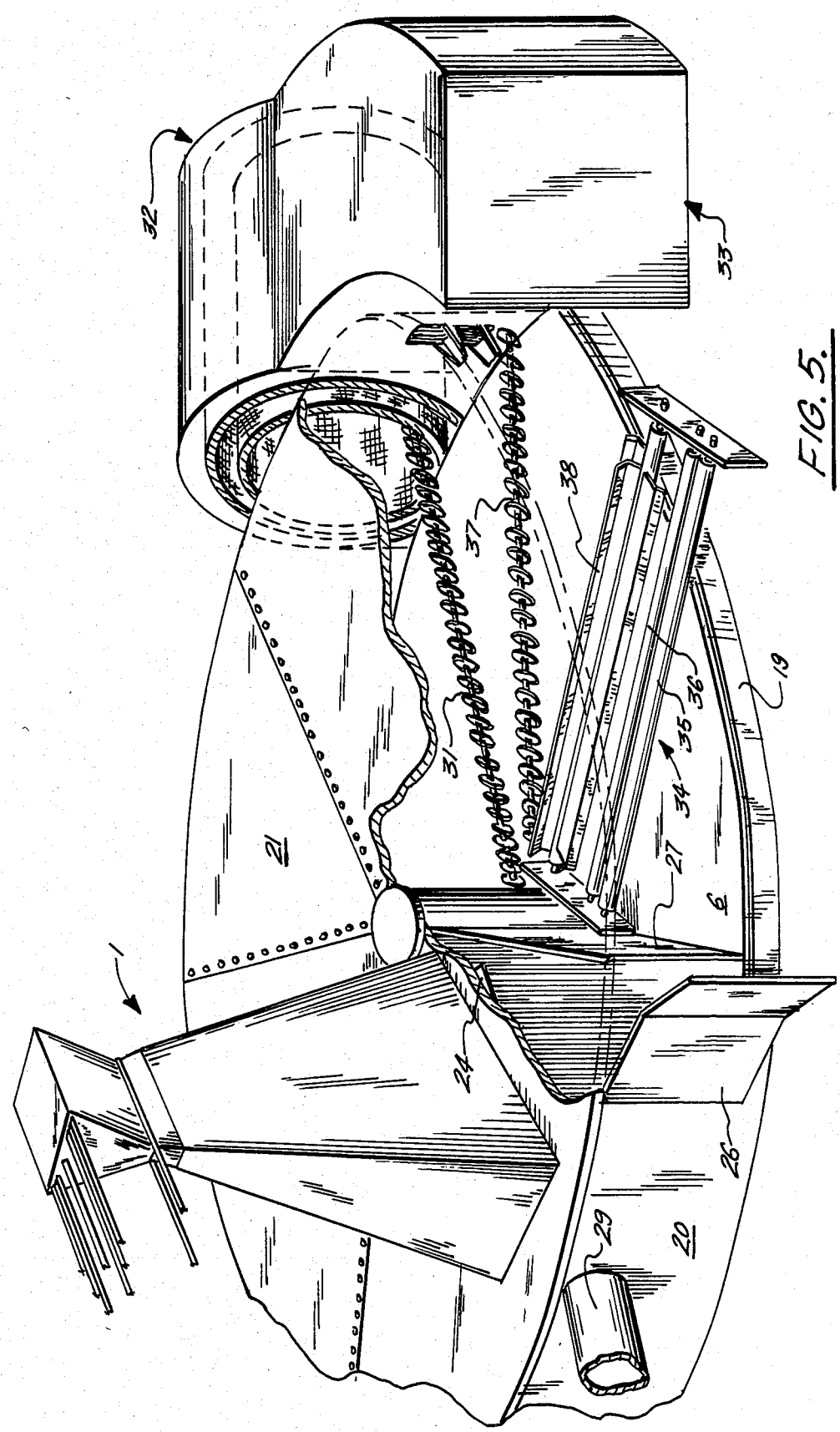
FIG. 5 is a three dimensional elevated view illustrating a preferred embodiment of the fertilizer sizing assembly.

Turning now to FIGS. 1–8, preferred embodiments of the apparatus utilized to carry out the processes of this invention can be seen. In its more basic form, the equipment comprises a controlled dispersion reactor, denoted generally by the numeral 1, having a convergent inlet section 2 for receiving the acid, ammonia and other reaction products. Inlet section 2 swages to a variable cross section orifice section 3 where the reaction products are contacted together before being discharged through a divergent discharge section 4 onto seed material lying on revolving table 6 of a chamber assembly denoted generally by the numeral 17.

In a preferred embodiment, phosphoric acid, and, if desired, sulphuric acid, along with the recycling partially neutralized phosphoric acid solution obtained from a scrubber system as explained below, is introduced to inlet section 2 through lines 7 and 8 located at the top end of inlet section 2, and ammonia is introduced through lines 9 and 10 located at the lower end of inlet section 2 and through line 15 located in the upper region of the inlet section 2. In a preferred embodiment, lines 11, 12, 13 and 14 can be provided to allow for the introduction of steam and/or air to provide better control of the reaction products produced.

In a preferred embodiment, variable cross section orifice section 3 is sized so that the reaction products are in reacting contact for less than two seconds before being propelled into discharge section 4, preferably at velocities between 5–600 ft. per second. More preferably, the reaction time in orifice section 3 will be between 0.05–1.0 second. The purpose of the variable cross section provided for orifice section 3, is to permit adjusting the velocities and hence the drop sizes of the resultant products emitted therefrom.

In another preferred embodiment, discharge section 4 comprises closed hooded walls 16 having a continuously increasing cross sectional area. This embodiment provides for better control of resultant product particle size, thus reducing effluent problems and providing for better reaction control between the resultant products and seed material.

FIGS. 6 and 7 illustrate a preferred alternate embodiment of controlled dispersion reactor 1. In this embodiment, reactor 1 comprises, as before, a convergent inlet section 2', variable cross section orifice section 3' and divergent discharge section 4'. However, to facilitate construction of reactor 1, and provide for better contact between the phosphoric acid and ammonia and other reactant products, a preferred positioning of reactant product lines is desired. More particularly, line 40, utilized for introduction of ammonia, would be positioned between lines 41 and 42, utilized for introduction of phosphoric acid and/or other acids. Lines 43 and 44, utilized for introduction of the partially reacted ammonia-phosphoric acid liquor from the scrubber to inlet section 2', are connected to lines 41 and 42, respectively. Air or steam can then be introduced directly into opening 45 of convergent inlet section 2'.

Chamber assembly 17 comprises table 6 which revolves about a center axis assembly 18. Table 6 is maintained in an enclosure formed by floor 19, walls 20 and cover 21 and supported above floor 19 by rollers 22 as shown. As seen more clearly in FIG. 3, the resultant products are discharged into a mixing zone 23 where mixers 24 mix the resultant product with seed material 5. In a preferred embodiment, seed material 5 comprises small particles of the desired fertilizer product.

In another preferred embodiment, mixing zone 23 is segregated from other sections of table 6 by partitions 25, 26 and 27. In this embodiment, air exiting through duct 28 can be passed over the resultant products and seed material to help control their temperature and moisture content. This air and other reaction gases are then sucked through duct 29, which leads to a scrubber assembly (not shown) to recapture ammonia (by passing through phosphoric or other acid mist) for recycling to lines 7 and 8.

Direct your attention now to FIG. 8, which depicts another preferred embodiment, mixer sparger assembly 46, and shows more clearly how reactants and reaction products are dispensed and sparged from moving, positive action mixers 24—often referred to as blades, arms, rakes or plows—then dispersed, contacted and reacted to form a seed bed which is further mixed and agglomerated to form closely sized granules through the combined positive actions of mixers 24 and flat, horizontal moving surface 6. Line 47 is utilized for the introduction, as desired, of any of the fluids or slurries or combinations of phosphoric acid, sulfuric acid, other mineral acids, scrubber liquor, ammonia phosphates or ammonia polyphosphates into the two-fluid swivel coupling assembly 48, which also receives ammonia through line 49 and accomodates and accomplishes the transitions from the stationary lines 47 and 49 to the rotary mixer sparger assembly 46. The acids liquor leaves coupling 48 through internal line 50 located concentrically inside hollow mixer-sparger assembly 46, its arms 51. its downcomer mixers 24, and is discharged into mixing zone 23 through sparging orifices 52 located in mixer plows 53 attached to the terminal ends of mixers 24. The ammonia leaves coupling 48 through the annular space 55 between line 50 and the inner walls of hollow mixer-sparger assembly 46, and is discharged into mixing zone 23 through sparging orfices 54, located adjacent to, and immediately below acid sparging orifices 52 in mixing plows 53, which disperse, contact, mix and aerate the reactants and reaction products, gradually forming them into closely sized granules. The mixer-sparger assembly 46 is supported for its rotational movement by support bearing 56, and is caused to rotate by a suitable motor-varidrive gear means through a suitable drive chain, means that engages into rotary drive sprocket 57.

As table 6 revolves about axis 18, the material passes over ammonia sparger 39 to complete the ammoniation reactions, then the material preferably passes through several series of plows 30 to insure proper cooking and drying of the seed material and resultant products to achieve the desired fertilizer moisture content and temperature. By controlling the speed of table 6, the fertilizer pellets will achieve the desired moisture content and temperature by the time they reach conveyor screw 31, which removes a controlled portion of fertilizer pellets from table 6 and onto screening assembly 32, which separates out the desired sized fertilizer pellets.

In a preferred embodiment, the rejected undersized or oversized fertilizer pellets are returned to table 6 by conventional transfer means 33 where they are spread evenly by conveyor screw 37. Then the preponderance of the material on table 6 is lifted by rotary device 38 and dropped and guided between a roller assembly 34 having rollers 35 and 36, which crush the pellets as they pass between the rollers. The crushed pellets then pass under partition 27 and into mixing zone 23.

In addition to the specific preferred embodiments of the invention described above, the novel concepts disclosed can also be used in the design of process and apparatus for converting urea melt to relatively close sized prills; process and apparatus to agglomerate ammonia nitrate melt into closely sized prills; process and apparatus to remove free and chemically combined moisture from most organic and inorganic compositions whether in liquid slurry or melt form, as well as, with organic and inorganic solids of crystalline and amorphous types; processes and appartus for heat removal from most organic and inorganic solid; process and apparatus for crushing coal rock and phosphate utilizing gravity features, process and apparatus for concentration of mineral values to commercially desirable levels; process and apparatus for increasing the single train capacity when nodulizing iron ores; and process and apparatus for achieving a two moles of ammonia reacted per mole of phosphoric acid ($H_3PO_4$)for producing diammonia phosphate having less than 5% moisture content.

There are, of course, many alternate embodiments of the invention not specifically disclosed, but which are intended to be within the scope of this invention as defined by the following Claims.

What I claim is:
1. A process for producing fertilizers comprising:
   (a) directing reactants down a convergent inlet section of a controlled dispersion reactor to its orifice section at a predetermined velocity sufficient to cause back mixing of said reaction products for a period of time less than 2 seconds in said controlled dispersion reactor to produce a resultant product;
   (b) discharging said resultant product at a controlled velocity onto seed material lying on a flat horizontal moving surface;
   (c) mixing thoroughly said resultant product and said seed material on said moving surface for a period of time to produce a predetermined sized fertilizer; and
   (d) removing said fertilizer from said moving surface.
2. A process according to claim 1 wherein said velocity is between 5 and 600 feet per second.

3. A process according to claim 1 wherein said resultant product is discharged to travel in a pattern of increasing cross sectional area.

4. A process for producing fertilizers containing nitrogen and $P_2O_4$ which comprises:
   (a) directing $NH_3$ and $H_3PO_4$ down a convergent inlet section of a controlled dispersion reactor to its orifice section at predetermined velocity surficient to cause back mixing of said $NH_3$ and $H_3PO_4$ for a period of time less than 2 seconds in said controlled dispersion reactor produce resultant products comprising monoammonium phosphate, diammonium phosphate, ammonium polyphosphate or mixtures thereof;
   (b) discharging said resultant products from said orifice section in a pattern of increasing cross sectional area at a velocity between 5 and 660 feet per second onto seed material lying on a flat, horizontal moving surface;
   (c) mixing, reacting and aerating said resultant products and said seed material by positive means using moving blades located in a mixing zone on said moving surface for a period of time necessary to produce said fertilizer to a perdetermined size; and
   (d) removing said fertilizer from said moving surface.

5. A process according to claim 4 wherein said seed material in said fertilizer is of a size less than said predetermined size.

6. A process according to claim 4 wherein air is blown across said resultant products and seed material during mixing.

7. A process according to claim 6 wherein said air and any other gaseous resultant product is removed from said mixing zone.

8. A process according to claim 4 wherein said fertilizer removed from said moving surface is classified by size.

9. A process according to claim 8 wherein after classification, said fertilizer greater than said predetermined size is crushed to a size less than said predetermined size and returned to said mixing zone.

10. A process for producing fertilizers comprising:
    (a) directing reactants down a convergent inlet section of a controlled dispersion reactor to its orifice section at a predetermined velocity sufficient to cause back mixing of said reaction products for a period of time less than 2 seconds in said controlled dispersion reactor to produce a resultant product;
    (b) discharging said resultant product at a controlled velocity onto seed material lying on a flat horizontal moving surface;
    (c) reacting said resultant product with said seed material for a sufficient period of time to produce a predetermined sized fertilizer; and
    (d) removing said fertilizer from said moving surface.

11. A process according to claim 10 wherein said reactants are $NH_3$ and $H_3PO_4$ and said resultant products are from a group comprising monoammonium phosphate, diammonium phosphate, ammonium polyphosphate or mixtures thereof.

* * * * *